(12) United States Patent
Nishimura et al.

(10) Patent No.: US 10,050,469 B2
(45) Date of Patent: Aug. 14, 2018

(54) UNINTERRUPTIBLE POWER SUPPLY DEVICE AND UNINTERRUPTIBLE POWER SUPPLY SYSTEM USING THE SAME

(71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Hiroshi Masunaga, Chuo-ku (JP); Masahiro Kinoshita, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/562,075

(22) PCT Filed: Apr. 1, 2015

(86) PCT No.: PCT/JP2015/060325
§ 371 (c)(1),
(2) Date: Sep. 27, 2017

(87) PCT Pub. No.: WO2016/157468
PCT Pub. Date: Oct. 6, 2016

(65) Prior Publication Data
US 2018/0076657 A1    Mar. 15, 2018

(51) Int. Cl.
*H02J 9/06*   (2006.01)
*H02J 7/12*   (2006.01)
*H02J 3/38*   (2006.01)
*H02M 7/493*  (2007.01)
*H02M 7/12*   (2006.01)

(52) U.S. Cl.
CPC ........ *H02J 9/06* (2013.01); *H02J 3/38* (2013.01); *H02M 7/12* (2013.01); *H02M 7/493* (2013.01)

(58) Field of Classification Search
CPC .......... H02J 9/06; H02J 9/04; H02J 2009/063; H02J 2009/068; H02J 3/38; H02M 7/00; H02M 7/12; H02M 7/48
See application file for complete search history.

(56) References Cited

U.S. PATENT DOCUMENTS

2008/0197706 A1*  8/2008  Nielsen ................. H02J 1/102
                                                    307/66
2011/0134672 A1*  6/2011  Kinoshita .................... 363/126

FOREIGN PATENT DOCUMENTS

JP    2013-162593 A    8/2013

OTHER PUBLICATIONS

International Search Report dated Jun. 23, 2015, in PCT/JP2015/060325, filed Apr. 1, 2015.

* cited by examiner

*Primary Examiner* — Rexford Barnie
*Assistant Examiner* — Thai Tran
(74) *Attorney, Agent, or Firm* — Oblon, McClelland, Maier & Neustadt, L.L.P.

(57) ABSTRACT

An uninterruptible power supply device (U1) includes a converter (40), an inverter (41), a bidirectional chopper (24), and a controller (53). The bidirectional chopper (24) includes first to fourth transistors (Q11-Q14), first to fourth diodes (D11-D14), and first and second, coils (51, 52). In a charging mode, the controller (53) causes the first and fourth transistors (Q11, Q14) to be complementarily turned on and controls the ON period of each of the first and fourth transistors (Q11, Q14) so as to cause respective detected values of first current and second current (I1, I2) flowing through the first coil and the second coil (51, 52) to be equal to each other.

6 Claims, 7 Drawing Sheets

UNINTERRUPTIBLE POWER SUPPLY DEVICE AND UNINTERRUPTIBLE POWER SUPPLY SYSTEM USING THE SAME

TECHNICAL FIELD

The present invention relates to an uninterruptible power supply device and an uninterruptible power supply system using the uninterruptible power supply device, and particularly to an uninterruptible power supply device including a bidirectional chopper and an uninterruptible power supply system including a plurality of uninterruptible power supply devices.

BACKGROUND ART

Japanese Patent Laying-Open No. 2013-162593 (Patent Document 1) discloses a power conversion system including a DC voltage source, a plurality of power converters connected in parallel with one another to a load, and a plurality of saturable reactors connected between the DC voltage source and respective power converters. Each power converter converts a DC voltage supplied from the DC voltage source through the saturable reactor into a three-phase AC voltage and supplies the AC voltage to the load. The saturable reactors suppress cross current circulating through a plurality of power converters.

CITATION LIST

Patent Document

PTD 1: Japanese Patent Laying-Open No. 2013-162593

SUMMARY OF INVENTION

Technical Problem

The conventional power conversion system, however, is equipped with the saturable reactor for each power converter, and therefore the device has a large size and requires high cost.

A chief object of the present invention is therefore to provide a small-sized and low-cost uninterruptible power supply device capable of suppressing cross current as well as an uninterruptible power supply system using the uninterruptible power supply device.

Solution to Problem

An uninterruptible power supply device of the present invention includes: a converter configured to convert an AC voltage supplied from an AC power supply into a first DC voltage, a second DC voltage and a third DC voltage and output the first, second, and third DC voltages to a first DC bus, a second DC bus, and a third DC bus, respectively; an inverter configured to convert the first, second, and third DC voltages supplied through the first, second, and third DC buses into an AC voltage and supply the AC voltage to a load; and a bidirectional chopper connected between the first, second, and third DC buses and a power storage device. The first DC voltage is, higher than the second DC voltage, and the third DC voltage is an intermediate voltage between the first DC voltage and the second DC voltage. The bidirectional chopper includes: a first transistor and a second transistor connected in series between the first DC bus and the third DC bus; a third transistor and a fourth transistor connected in series between the third DC bus and the second DC bus; a first diode, a second diode, a third diode, and a fourth diode connected in anti-parallel with the first transistor, the second transistor, the third transistor, and the fourth transistor, respectively; and a normal mode reactor including a first coil connected between a first node between the first transistor and the second transistor and a positive electrode of the power storage device, and a second coil connected between a negative electrode of the power storage device and a second node between the third transistor and the fourth transistor. The uninterruptible power supply device further includes a controller configured to perform a charging mode during a normal condition in which the AC power supply supplies an AC voltage, the controller in the charging mode causing the first transistor and the fourth transistor to be complementarily turned, on to charge the power storage device, and a discharging mode during an outage in which the AC power supply stops supply of AC power, the controller in the discharging mode causing the second transistor and the third transistor to be complementarily turned on to discharge the power storage device. The controller in the charging mode controls an ON period of at least one of the first transistor and the fourth transistor to cause a value of current flowing through the first coil to be equal to a value of current flowing through the second coil.

Advantageous Effects of Invention

In the uninterruptible power supply device of the present invention, the ON period of at least one of the first transistor and the fourth transistor is controlled so that respective values of current flowing through the first coil and current flowing through the second coil included in the bidirectional chopper are equal to each other. Accordingly, when a plurality of uninterruptible power supply devices are connected in parallel with one another to a load, cross current circulating through the plurality of uninterruptible power supply devices can be suppressed. Further, as compared with the case where saturable reactors are provided to suppress cross current, the size and the cost of the device can be reduced.

DESCRIPTION OF EMBODIMENTS

Figure 1:
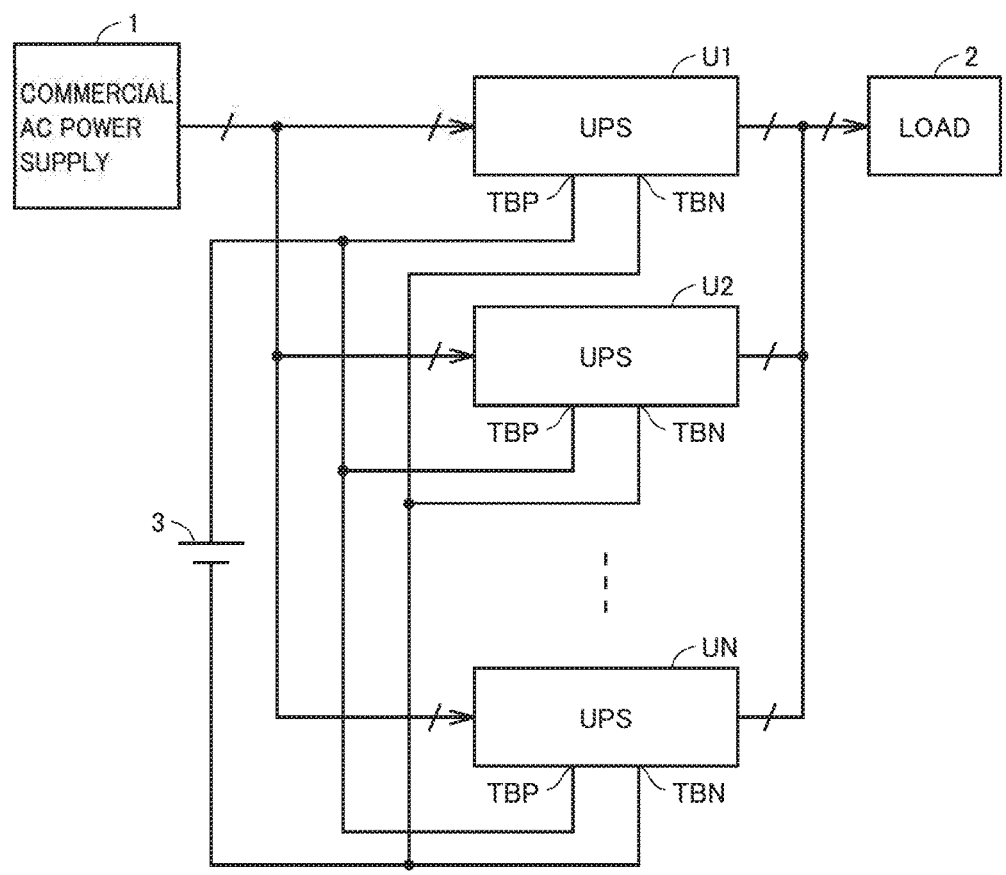
FIG. 1 is a circuit block diagram showing a configuration of an uninterruptible power supply system according to an embodiment of the present invention.

FIG. 1 is a circuit block diagram showing a configuration of an uninterruptible power supply system according to an embodiment of the present invention. In FIG. 1, the uninterruptible power supply system includes N (N is an integer of two or more) uninterruptible power supply devices (UPS) U1 to UN and a battery (power storage device) 3.

Uninterruptible power supply devices U1 to UN are connected in parallel between a commercial AC power supply 1 and a load 2. The number N of uninterruptible power supply devices U1 to UN, is selected to enable, when one of the uninterruptible power supply devices fails for example, load 2 to keep operating by means of the remaining (N−1) uninterruptible power supply devices. Battery 3 is shared by uninterruptible power supply devices U1 to UN and stores DC power. Instead of battery 3, a capacitor may be connected.

During a normal condition in which commercial AC power supply 1 properly supplies three-phase AC power, each of uninterruptible power supply devices U1 to UN converts the three-phase AC power into DC power to supply the DC power to battery 3, and converts the DC power into three-phase AC power to supply the AC power to load 2. Load 2 is driven by the three-phase AC power supplied from uninterruptible power supply devices U1 to UN. The current to be consumed by load 2 is supplied equally from N uninterruptible power supply devices U1 to UN.

During an outage in which commercial AC power supply 1 stops supply of the three-phase AC power, each of uninterruptible power supply devices U1 to UN converts the DC power of battery 3 into three-phase AC power to supply the AC power to load 2. Therefore, during the period in which battery 3 stores DC power, load 2 can continue operating.

Figure 2:
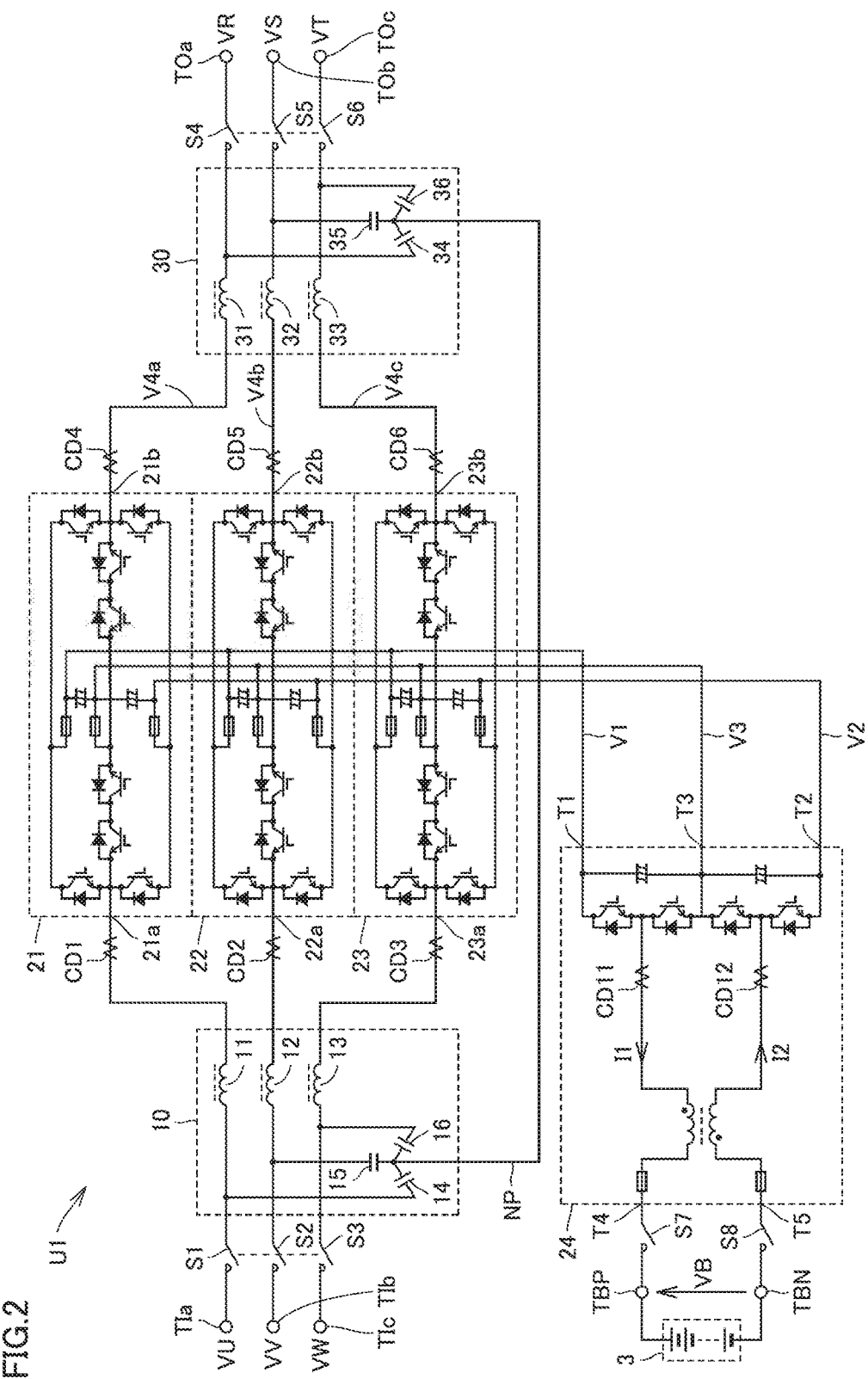
FIG. 2 is a circuit diagram showing a configuration of an uninterruptible power supply device shown in FIG. 1.

FIG. 2 is a circuit diagram showing a configuration of uninterruptible power supply device U1. Uninterruptible power supply devices U1 to UN have the same configuration. In FIG. 2, uninterruptible power supply device U1 includes AC input terminals TIa, TIb, TIc, AC output terminals TOa, TOb, TOc, and battery terminals TBP, TBN. AC input terminals TIa, TIb, TIc receive three-phase AC voltages VU, VV, VW at a commercial frequency, respectively, from commercial AC power supply 1. Respective AC input terminals TIa of uninterruptible power supply devices U1 to UN are connected to one another, respective AC input terminals TIb are connected to one another, and respective AC input terminals TIc are connected to one another.

AC output terminals TOa, TOb, TOc are provided in order to output respective three-phase AC voltages VR, VS, VT at the commercial frequency to load 2. Respective AC output terminals TOa of uninterruptible power supply devices U1 to UN are connected to one another, respective AC output terminals TOb are connected to one another, and respective AC output terminals TOc are connected to one another.

Battery terminals TBP and TBN are connected respectively to the positive electrode and the negative electrode of battery 3. Respective battery terminals TBP of uninterruptible power supply devices U1 to UN are connected to one another, and respective battery terminals TBN thereof are connected to one another.

Uninterruptible power supply device U1 further includes switches S1 to S8, an input filter 10, current detectors CD1 to CD6, CD11, CD12, power converters 21 to 23, a bidirectional chopper 24, and an output filter 30. Switches S1, S3, and S3 have respective first terminals connected to AC input terminals TIa, TIb, and TIc, respectively, and respective second terminals connected to input filter 10. During a normal condition switches S1 to S3 are ON. When maintenance of uninterruptible power supply device U1 is to be performed, for example, switches S1 to S3 are made OFF.

Input filter 10 includes reactors 11 to 13 and capacitors 14 to 16. Reactors 11 to 13 have respective first terminals connected to the second terminals of switches S1 to S3, respectively, and respective second terminals connected to input terminals 21a to 23a of power converters 21 to 23 respectively. Capacitors 14 to 16 have respective first terminals connected to the first terminals of reactors 11 to 13, and respective second terminals connected commonly to a neutral point NP.

Reactors 11 to 13 and capacitors 14 to 16 form a low-pass filter. Input filter 10 allows three-phase AC power at the commercial frequency from commercial AC power supply 1 to pass through toward power converters 21 to 23, and prevents a signal at a switching frequency generated by power converters 21 to 23 from passing through toward commercial AC power supply 1.

Current detectors CD1 to CD3 detect respective instantaneous values of current flowing from commercial AC power supply 1 to input terminals 21a to 23a of power converters 21 to 23, and output signals indicative of the detected values to a controller (not shown). The controller (not shown) controls power converters 21 to 23 so that respective phases of AC voltages VU, VV, VW match the phases of the current detected by current detectors CD1 to CD3, specifically the power factor is 1.0.

During a normal condition in which commercial AC power supply 1 supplies three-phase AC power, power converters 21 to 23 convert the three-phase AC power supplied from commercial AC power supply 1 to input terminals 21a to 23a into DC power to supply the DC power to battery 3 through bidirectional chopper 24, and also convert the DC power into three-phase AC power to output the AC power to output terminals 21b to 23b.

During an outage in which commercial AC power supply 1 stops supply of the three-phase AC power, power converters 21 to 23 convert DC power supplied from battery 3 through bidirectional chopper 24 into three-phase AC power to output the AC power to output terminals 21b to 23b.

Specifically, during a normal condition, power converters 21 to 23 convert three-phase AC voltages VU, VV, VW which are supplied from commercial AC power supply 1 to input terminals 21a to 23a into DC voltages V1 to V3, and convert these DC voltages V1 to V3 into three-phase AC voltages V4a to V4c to output the AC voltages to output terminals 21b to 23b. During an outage, power converters 21 to 23 convert DC voltages V1 to V3 generated based on DC power supplied from bidirectional chopper 24 into three-phase AC voltages V4a to V4c to output the AC voltages to output terminals 21b to 23b.

Bidirectional chopper 24 includes five terminals T1 to T5. Terminals T1 to T3 receive DC voltages V1 to V3 generated by power converters 21 to 23, respectively. Switches S7 and S8 have respective first terminals connected to terminals T4 and T5, respectively, and respective second terminal connected to battery terminals TBP and TBN, respectively. Battery terminals TBP and TBN are connected to the positive electrode and the negative electrode of battery 3, respectively. During a normal condition, switches S7 and S8 are ON. When maintenance of uninterruptible power supply device U1 or battery 3 is to be performed, for example, switches S7 and S8 are made OFF.

During a normal condition in which commercial AC power supply 1 supplies three-phase AC power, bidirectional chopper 24 stores, in battery 3, DC power generated by power converters 21 to 23. During an outage in which supply of the three-phase AC power from commercial AC power supply 1 is stopped, bidirectional chopper 24 supplies the DC power of battery 3 to power converters 21 to 23.

Specifically, during a normal condition, bidirectional chopper 24 steps down DC voltage VDC (=V1−V2) generated by power converters 21 to 23 to supply the resultant voltage to battery 3 and thereby charge battery 3. During an outage, bidirectional chopper 24 steps up terminal-to-terminal voltage VB of battery 3 to generate DC voltage VDC, and supplies DC voltage VDC to power converters 21 to 23 to discharge battery 3.

Current detector CD11 is placed in bidirectional chopper 24 for detecting as instantaneous value of current I1 flowing from, terminal T1 or T3 to terminal T4. Current detector CD12 is placed in bidirectional chopper 24 for detecting an instantaneous value of current I2 flowing from terminal T5 to terminal T3 or T2. The controller (not shown) controls bidirectional chopper 24 based on DC voltages V1 to V3, the terminal-to-terminal voltage of battery 3, and the values detected by current detectors CD11, CD12, for example.

Current detectors CD4 to CD6 detect respective instantaneous values of output current from power converters 21 to 23. The values detected by current detectors CD4 to CD6 are supplied to the controller (not shown). The controller (not shown) communicates with other uninterruptible power supply devices U2 to UN and controls power converters 21 to 23 based on the values detected by current detectors CD4 to CD6, so that the load current is equally supplied from uninterruptible power supply devices U1 to UN.

Output filter 30 includes reactors 31 to 33 and capacitors 33 to 36. Reactors 31 to 33 have respective first terminals connected to output terminals 21b to 23b of power converters 21 to 23, respectively. Respective first terminals of capacitors 34 to 36 are connected to respective second terminals of reactors 31 to 33. Respective second terminals of capacitors 34 to 36 are connected commonly to neutral point NP. Reactors 31 to 33 and capacitors 34 to 36 form a low-pass filter.

Output filter 30 allows three-phase AC power at the commercial frequency generated by power converters 21 to 23 to pass through toward load 2, and prevents a signal at a switching frequency generated by power converters 21 to 23 from passing through toward load 2. Specifically, output filter 30 converts AC voltages V4a to V4c generated by power converters 21 to 13 into sinusoidal three-phase AC voltages VR, VS, VT to supply the AC voltages to load 2.

Switches S4 to S6 have respective first terminals connected to respective second terminals of reactors 31 to 33 and respective second terminals connected to AC output terminals TOa to TOc, respectively. During a normal condition, switches S4 to S6 are ON. When maintenance of uninterruptible power supply device U1 is to be performed, for example, switches S4 to S6 are made OFF.

Figure 3:
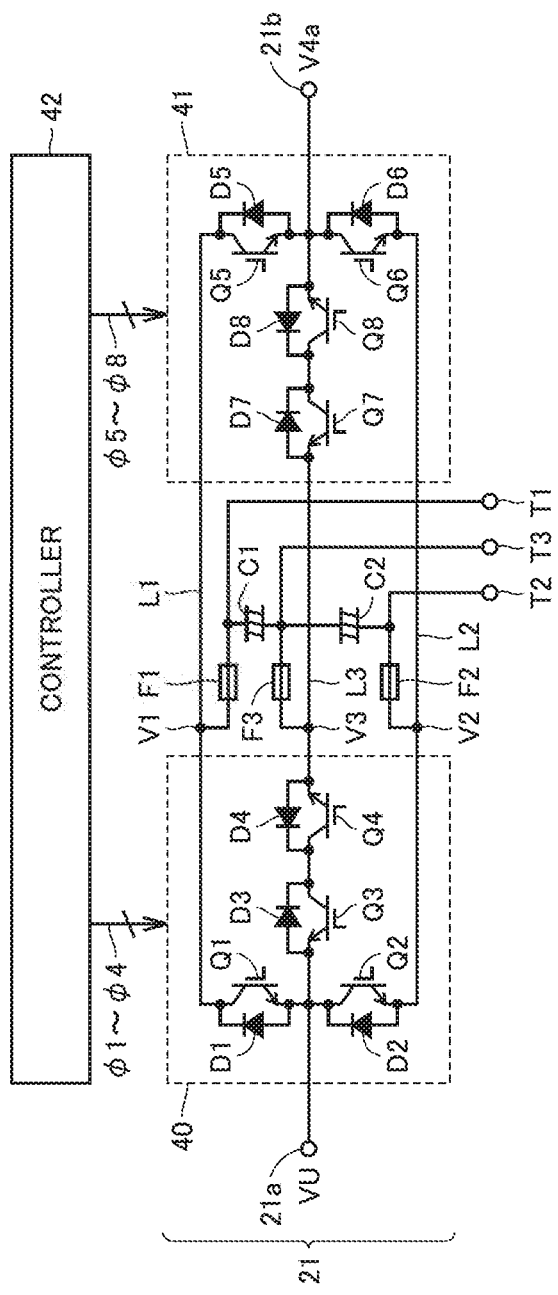
FIG. 3 is a circuit block diagram showing a configuration of a power converter shown in FIG. 2.

FIG. 3 is a circuit block diagram showing a configuration of power converter 21. In FIG. 3, power converter 21 includes an input terminal 21a, a converter 40, a DC positive bus L1, a DC negative bus L2, a DC neutral point bus L3, capacitors C1, C2, fuses F1 to F3, an inverter 41, and an output terminal 21b. Power converter 21 is controlled by a controller 42.

Controller 42 generates PWM (pulse width modulation) signals $\phi1$ to $\phi8$ for controlling converter 40 and inverter 41 based on an instantaneous value of AC voltage VU supplied to input terminal 21a, respective instantaneous values of DC voltages V1 to V3 on buses L1 to L3, an instantaneous value of voltage VR on output terminal TOa, and values detected by current detectors CD11, CD4, for example.

Converter 40 includes transistors Q1 to Q4 and diodes D1 to D4. Transistors Q1 to Q4 are each an IGBT (Insulated Gate Bipolar Transistor), for example. Transistor Q1 has a collector connected to DC positive bus L1 and an emitter connected to input terminal 21a. Diode D1 has an anode connected to input terminal 21a and a cathode connected to DC positive bus L1. In other words, diode D1 is connected in anti-parallel with transistor Q1.

Transistor Q2 has a collector connected to input terminal 21a and an emitter connected to DC negative bus L2. Diode D2 has an anode connected to DC negative bus L2 and a cathode connected to input terminal 21a. In other words, diode D2 is connected in anti-parallel with transistor Q2.

Respective collectors of transistors Q3, Q4 are connected to each other, and respective emitters of transistors Q3, Q4 are connected to input terminal 21a and DC neutral point bus L3, respectively. Diodes D3, D4 have respective cathodes connected, to the emitters of transistors Q3, Q4, and respective anodes connected to input terminal 21a and DC neutral point bus L3, respectively. In other words, diodes D3 and D4 are connected in anti-parallel with transistors Q3 and Q4, respectively. Transistors Q3, Q4 and diodes D3, D4 form a bidirectional switch.

Respective gates of transistors Q1 to Q4 receive PWM signals $\phi1$ to $\phi4$ from controller 42. PWM signals $\phi1$ to $\phi4$ are generated in synchronization with AC voltage VU and have a frequency sufficiently higher than that of AC voltage VU. PWM signals $\phi1$ and $\phi4$ are complementary to each other, and PWM signals $\phi2$ and $\phi3$ are complementary to each other.

When AC voltage VU is a positive voltage, for example, PWM signals $\phi1$ and $\phi4$ are alternately set to "H" level and PWM signals $\phi2$ and $\phi3$ are fixed at "L" level and "H" level, respectively. Accordingly, transistors Q1 and Q4 are alternately turned on and transistors Q2 and Q3 are fixed in the OFF state and the ON state, respectively.

When AC voltage is a negative voltage, PWM signals $\phi2$ and $\phi3$ are alternately set to "H" level and PWM signals $\phi1$ and $\phi4$ are fixed at "L" level and "H" level, respectively. Accordingly, transistors Q2 and Q3 are alternately turned on and transistors Q1 and Q4 are fixed in the OFF state and the ON state, respectively.

In one cycle of the PWM signal, the ratio between the time for which the PWM signal is at "H" level and the period of one cycle of the PWM signal is called duty ratio. Controller 42 controls the duty ratio of PWM signals $\phi1$ to $\phi4$ in synchronization with AC voltage VU to cause AC voltage VU to be converted into DC voltages V1 to V3. DC voltages V1 to V3 are supplied to DC positive bus L1, DC negative bus L2, and DC neutral point bus L3, respectively. V1>V3>V2 and V3=(V1+V2)/2 bold. When DC neutral point bus L3 is grounded, DC voltages V1, V2, and V3 are a positive voltage, a negative voltage, and 0 V, respectively.

During a normal condition in which commercial AC power supply 1 supplies AC voltage VU, controller 42 controls transistors Q1 to Q4 of converter 40 to cause AC voltage VU to be converted into DC voltages V1 to V3. During an outage in which commercial AC power supply 1 stops supply of AC voltage VU, controller 42 fixes transistors Q1 to Q4 in the OFF state to cause operation of converter 40 to be kept stopped.

Fuses F1 to F3 have respective first terminals connected to buses L1 to L3, respectively, and respective second terminals connected to terminals T1 to T3 of bidirectional chopper 24, respectively. Fuses F1 to F3 are blown when overcurrent flows between buses L1 to L3 and terminals T1 to T3 to protect uninterruptible power supply device U1. Capacitor C1 is connected between respective second terminals of fuses F1 and F3 to smooth and stabilize the DC voltage between buses L1 and L3. Capacitor C2 is connected between respective second terminals of fuses F3 and F2 to smooth and stabilize the DC voltage between buses L3 and L2.

Inverter 41 includes transistors Q5 to Q8 and diodes D5 to D8. Transistors Q5 to Q8 are each an IGBT, for example. Transistor Q5 has a collector connected to DC positive bus L1 and an emitter connected to output terminal 21b. Diode D5 has an anode connected to output terminal 21b and a cathode connected to DC positive, bus L1.

Transistor Q6 has a collector connected to output terminal 21b and an emitter connected to DC negative bus L2. Diode D6 has an anode connected to DC negative bus L2 and a cathode connected to output terminal 21b. In other words, diodes D5 and D6 are connected in anti-parallel with transistors Q5 and Q6, respectively.

Respective collectors of transistors Q7, Q8 are connected to each other, and respective emitters of transistors Q7, Q8 are connected to DC neutral point bus L3 and output terminal 21b, respectively. Diodes D7, D8 have respective cathodes connected to the collectors of transistors Q7, Q8, and respective anodes connected to DC neutral point bus L3 and output terminal T14, respectively. In other words, diodes D7 and D8 are connected in anti-parallel with transistors Q7 and Q8, respectively. Transistors Q7, Q8 and diodes D7, D8 form a bidirectional switch.

Figure 4:
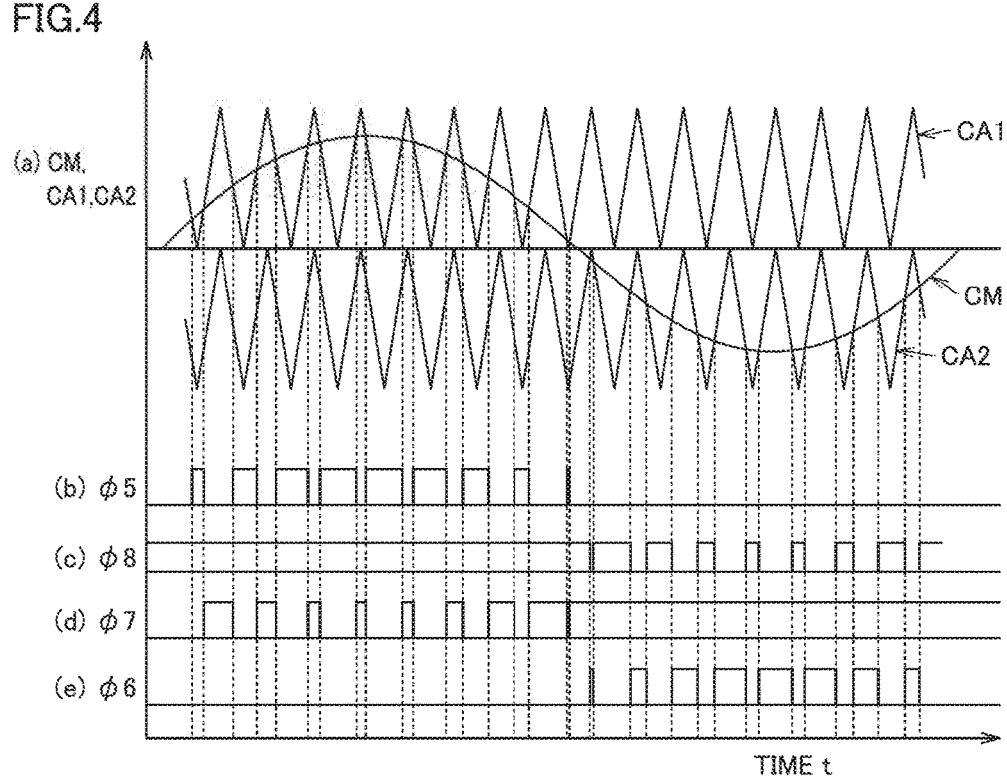
FIG. 4 is a time chart showing respective waveforms of PWM signals for controlling an inverter shown in FIG. 3.

Next, an operation of inverter 41 is described. Respective gates of transistors Q5 to Q8 receive PWM signals ϕ5 to ϕ8 from controller 42. FIG. 4 (a) to (e) illustrate how PWM signals ϕ5 to ϕ8 are generated and respective waveforms of these signals. Specifically, FIG. 4 (a) shows respective waveforms of sinusoidal command value signal CM, positive triangular wave carrier signal CA1, and negative triangular wave carrier signal CA2, and FIG. 4 (b) to (e) show respective waveforms of PWM signals ϕ5, ϕ8, ϕ7, and ϕ6.

Referring to FIG. 4 (a) to (e), the frequency of sinusoidal command value signal CM is the commercial frequency, for example. Sinusoidal command value signal CM is in synchronization with AC voltage VU. Carrier signals CA1 and CA2 have the same period and are in phase. The period of carrier signals CA1, CA2 is sufficiently smaller than the period of sinusoidal command value signal CM.

The level of sinusoidal command value signal CM is compared with the level of positive triangular wave carrier signal CA1. When the level of sinusoidal command value signal CM is higher than the level of positive triangular wave carrier signal CA1, PWM signals ϕ5 and ϕ7 are set to "H" level and "L" level, respectively. When the level of sinusoidal command value signal CM is lower than the level of positive triangular wave carrier signal CA1, PWM signals ϕ5 and ϕ7 are set to "L" level and "H" level, respectively.

Therefore, in the period in which sinusoidal command value signal CM has a positive level, PWM signals ϕ5 and ϕ7 are alternately set to "H" level in synchronization with carrier signal CA1 and transistors Q5 and Q7 are alternately turned on. In the period in which sinusoidal command value signal CM has a negative level, PWM signals ϕ5 and ϕ7 are fixed at "L" level and "H" level, respectively, transistor Q5 is fixed in the OFF state, and transistor Q7 is fixed in the ON state.

The level of sinusoidal command value signal CM is compared with the level of negative triangular wave carrier signal CA2. When the level of sinusoidal command value signal CM is higher than the level of negative triangular wave carrier signal CA2, PWM signals ϕ6 and ϕ8 are set to "L" level and "H" level, respectively. When the level of sinusoidal command value signal CM is lower than the level of negative triangular wave carrier signal CA2, PWM signals ϕ6 and ϕ8 are set to "H" level and "L" level, respectively.

Therefore, in the period in which sinusoidal command value signal CM has a positive level, PWM signals ϕ6 and ϕ8 are fixed at "L" level and "H" level, respectively, transistor Q6 is fixed in the OFF state, and transistor Q8 is fixed in the ON state. In the period in which sinusoidal command value signal CM has a negative level, PWM signals ϕ6 and ϕ8 are alternately set to "H" level in synchronization with carrier signal CA2, and transistors Q6 and Q8 are alternately turned on.

In one cycle of the PWM signal, the ratio between the time for which the PWM signal is at "H" level and the period of one cycle of the PWM signal is called duty ratio. In the period in which sinusoidal command value signal CM has a positive level, PWM signal ϕ5 has the largest duty ratio around the positive peak (90 degrees) of sinusoidal command value signal CM. As the distance from the positive peak increases, the duty ratio of PWM signal ϕ5 decreases. The duty ratio is zero around 0 degrees and 180 degrees. In the period in which sinusoidal command value signal CM has a negative level, the duty ratio of PWM signal ϕ5 is fixed at zero. PWM signal ϕ7 is a complementary signal to PWM signal ϕ5.

In the period in which sinusoidal command value signal CM has a positive level, the duty ratio of PWM signal ϕ6 is fixed at zero. PWM signal ϕ6 has the largest duty ratio around the negative peak (270 degrees) of sinusoidal command value signal CM. As the distance from the negative peak increases, the duty ratio of PWM signal ϕ6 decreases. The duty ratio is zero around 180 degrees and 360 degrees. PWM signal ϕ8 is a complementary signal to PWM signal ϕ6.

For example, when AC voltage VU is a positive voltage, PWM ϕ5 and ϕ7 are alternately set to "H" level and PWM signals ϕ6 and ϕ8 are fixed at "L" level and "H" level, respectively. Accordingly, transistors Q5 and Q7 are alternately turned on and transistors Q6 and Q8 are fixed in the OFF state and the ON state, respectively.

When AC voltage VU is a negative voltage, PWM signals ϕ6 and ϕ8 are alternately set to "H" level and PWM signals ϕ5 and ϕ7 are fixed at "L" level and "H" level, respectively. Accordingly, transistors Q6 and Q8 are alternately turned on and transistors Q5 and Q7 are fixed in the OFF state and the ON state, respectively. Controller 42 controls the duty ratio of PWM signals ϕ5 to ϕ8 in synchronization with AC voltage VU and causes DC voltages V1 to V3 to be converted into AC voltages V4a of three levels.

Respective configurations of power converters 22, 23 are identical to the configuration of power converter 21 except for the following. Power convener 22 is controlled in synchronization with AC voltage VV and outputs AC voltage V4b that is in synchronization with AC voltage VV to output terminal 22b. Power converter 23 is controlled in synchronization with AC voltage VW and outputs AC voltage V4c that is in synchronization with AC voltage VW to output terminal 22c.

Figure 5:
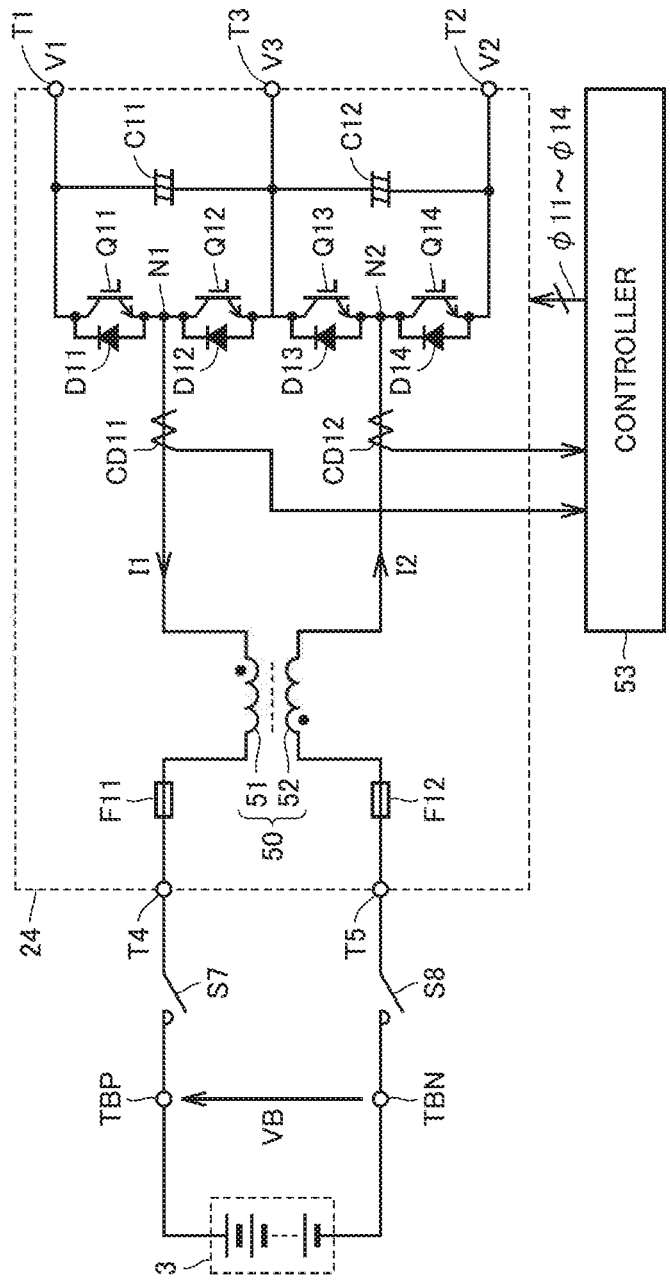
FIG. 5 is a circuit block diagram showing a configuration of a bidirectional chopper shown in FIG. 2.

FIG. 5 is a circuit block diagram showing a configuration of bidirectional chopper 24. In FIG. 5, bidirectional chopper 24 includes terminals T1 to T5, capacitors C11, C12, transistors Q11 to Q14, diodes D11 to D14, a normal mode reactor 50, and fuses F11, F12. Normal mode reactor 50 includes two coils 51, 52.

Bidirectional chopper 24 is controlled by a controller 53. Controller 53 generates PWM signals ϕ11 to ϕ14 for controlling transistors Q11 to Q14 based on an instantaneous value of DC voltage VDC (=V1−V2) between terminals T1 and T2 (namely between buses L1 and L2), terminal-to-terminal voltage VB of battery 3, and values detected by current detectors CD11, CD21, for example.

Terminals T1 to T3 are connected respectively to DC positive bus L1, DC negative bus L2, and DC neutral point bus L3 of each of power converters 21 to 23. Terminal T4 is connected to the positive electrode of battery 3 through switch S7 and battery terminal TBP. Terminal T5 is connected to the negative electrode of battery 3 through switch S8 and battery terminal TBN.

Capacitor C11 is connected between terminals T1 and T3 to smooth and stabilize the voltage between terminals T1 and T3. Capacitor C12 is connected between terminals T3 and T2 to smooth and stabilize the voltage between terminals T3 and T2. Capacitors C11 and C12 are charged respectively to the same voltages as capacitors C1 and C2 of power converters 21 to 23.

Transistors Q11 to Q14 are each an IGBT, for example. Transistors Q11, Q12 are connected in series between terminals T1 and T3, and transistors Q13, Q14 are connected in series between terminals T3 and T2. Diodes D11 to D14 are connected in anti-parallel with transistors Q11 to Q14, respectively.

Coil 51 has a first terminal connected to a node N1 between transistors Q11 and Q12 and a second terminal connected to terminal T4 through tease F11. Coil 52 has a first terminal connected to terminal T5 through fuse F12 and a second terminal connected to a node N2 between transistors Q13 and Q14. Fuses F11, F12 are blown when overcurrent flows to protect battery 3 and bidirectional chopper 24, for example.

In bidirectional chopper 24, current detectors CD11, CD12 are placed. Current detector CD11 detects an instantaneous value of DC current I1 flowing from node N1 to the first terminal of coil 51 and provides a signal indicative of the detected value to controller 53. Current detector CD12 detects an instantaneous value of DC current I2 flowing from the second terminal of coil 52 to node N2 and provides a signal indicative of the detected value to controller 53.

During a normal condition in which commercial AC power supply 1 supplies three-phase AC power, DC power is supplied from capacitors C1, C2 to battery 3 through bidirectional chopper 24 to charge battery 3. In this case, transistors Q12, Q13 are fixed in the OFF state and transistors Q11, Q14 are alternately turned on.

At this time, the duty ratio of PWM signals ϕ11, ϕ14 is controlled so that terminal-to-terminal voltage VB of battery 3 is equal to a predetermined target voltage VBT. Increase of the duty ratio of PWM signals ϕ11, ϕ14 causes increase of the current flowing from capacitors C11, C12 to battery 3. Decrease of the duty ratio of PWM signals ϕ11, ϕ14 causes decrease of the current flowing from capacitors C11, C12 to battery 3.

Specifically, in a first battery charging mode, PWM signals ϕ12 to ϕ14 are set to "L" level to cause transistors Q12 to Q14 to be turned off, and PWM signal ϕ11 is set to "H" level to cause transistor Q11 to be turned on. Accordingly, current flows from terminal T1 to terminal T3 through transistor Q11, coil 51, fuse F11, switch S7, battery 3, switch S8, fuse F12, coil 52, and diode D13, and capacitors C1, C11 are discharged to charge battery 3.

In a second battery charging mode, PWM signals ϕ12, ϕ13 are set to "L" level to cause transistors Q12 to Q13 to be turned off, and PWM signals ϕ11, ϕ14 are set to "H" level to cause transistors Q11, Q14 to be turned on. Accordingly, current flows from terminal T1 to terminal T2 through transistor Q11, coil 51, fuse F11, switch S7, battery 3, switch S8, fuse F12, coil 52, and transistor Q14, and capacitors C1, C2, C11, C12 are discharged to charge battery 3.

In a third battery charging mode, PWM signals ϕ11 to ϕ13 are set to "L" level to cause transistors Q11 to Q13 to be turned off, and PWM signal ϕ14 is set to "H" level to cause transistor Q14 to be turned on. Accordingly, current flows form terminal T3 to term final T2 through diode D12, coil 51, fuse F11, switch S7, battery 3, switch S8, fuse F12, coil 52, and transistor Q14, and capacitors C2 and C12 are discharged to charge battery 3.

The first battery charging mode and the third battery charging mode are performed by turns. In the period between the first battery charging mode and the third battery charging mode. PWM signals ϕ11 to ϕ14 are set to "L" level to cause transistors Q11 to Q14 to be turned off. Then, electromagnetic energy stored in coils 51, 52 is discharged, and current flows in a path through diode D12, coil 51, fuse F11, switch S7, battery 3, switch S8, fuse F12, coil 52, and diode D13 to charge battery 3. The second battery charging mode is a mode in which the first battery charging mode and the third battery charging mode overlap.

When battery 3 is to be charged, controller 53 generates PWM signals ϕ11, ϕ14 to cause transistors Q11, Q14 to be turned on/off so that the detected value of DC current I1 is equal to the detected value of DC current I2, so as to suppress cross current flowing through uninterruptible power supply devices U1 to UN. This is detailed later herein.

When supply of three-phase AC power from commercial AC power supply 1 is stopped, battery 3 supplies DC power to capacitors C1, C2, C11, C12 through bidirectional chopper 24, and thus battery 3 is discharged and capacitors C1, C2, C11, C12 are charged. In this case, transistors Q11, Q14 are fixed in the OFF state and transistors Q12, Q13 are alternately turned on.

At this time, the duty ratio of PWM signals ϕ12, ϕ13 is controlled so that DC voltage VDC (=V1−V2) between terminals T1 and T2 is equal to a predetermined target voltage VDCT. Increase of the duty ratio of PWM signals ϕ12, ϕ13 causes increase of the current flowing from battery 3 to capacitors C11, C12. Decrease of the duty ratio of PWM signals ϕ12, ϕ13 causes decrease of the current flowing from battery 3 to capacitors C11, C12.

Specifically, in a first battery discharging mode, PWM signals ϕ11, ϕ13, ϕ14 are set to "L" level to cause transistors Q11, Q13, Q14 to be turned off, and PWM signal ϕ12 is set to "H" level to cause transistor Q12 to be turned on. Accordingly, current flows from the positive electrode of battery 3 to the negative electrode of battery 3 through switch S7, fuse F11, coil 51, transistor Q12, capacitors C2, C12, diode D14, coil 52, fuse F12, and switch S8, and thus battery 3 is discharged and capacitors C2, C12 are charged.

In a second battery discharging mode, PWM signals ϕ11 to ϕ14 are set to "L" level to cause transistors Q11 to Q14 to be turned off. Accordingly, current flows from the positive electrode of battery 3 to the negative electrode of battery 3 through switch S7, fuse F11, coil 51, diode D11, capacitors C1, C2, C11, C12, diode D14, coil 52, fuse F12, and switch S8. Thus, electromagnetic energy stored in coils 51, 52 is discharged and battery 3 is discharged to charge capacitors C1, C2, C11, C12.

In a third battery discharging mode, PWM signals ϕ11, ϕ12, ϕ14 are set to "L" level to cause transistors Q11, Q12, Q14 to be turned off, and PWM signal ϕ13 is set to "H" level to cause transistor Q13 to be turned on. Accordingly, current flows from the positive electrode of battery 3 to the negative electrode of battery 3 through switch S7, fuse F11, coil 51, diode D11, capacitors C1, C11, transistor Q13, coil 52, fuse F12, and switch S8. Thus, battery 3 is discharged and capacitors C1, C11 are charged.

The first battery discharging mode and the third battery discharging mode are performed by turns. When voltage V1−V2 between terminals T1 and T2 is lower than terminal-to-terminal voltage VB of battery 3 in the period between the first battery discharging mode and the third battery discharging mode, the second battery discharging mode is performed.

Next, an operation of uninterruptible power supply device U1 shown in FIGS. 1 to 5 is described. During a normal condition in which commercial AC power supply 1 properly supplies three-phase AC power, the three-phase AC power from commercial AC power supply 1 is supplied to power converters 21 to 23 through switches S1 to S3 and input filter 10. The three-phase AC power is converted into DC power by respective converters 40 of power converters 21 to 23. In each of power converters 21 to 23, the DC power generated by converter 40 is stored in battery 3 through bidirectional chopper 24 and switches S7 and S8, and also supplied to inverter 41. Inverter 41 converts the DC power into AC power at the commercial frequency. The three-phase AC power generated by respective inverters 41 of power converters 21 to 23 is supplied to load 2 through output filter 30 and switches S4 to S6 to cause load 2 to operate.

During an outage in which commercial AC power supply 1 stops supply of AC power, operation of respective converters 40 of power converters 21 to 23 are stopped, and DC power of battery 3 is supplied to respective inverters 41 of power converters 21 to 23 through switches S7, S8 and bidirectional chopper 24. The DC power is then converted by respective inverters 41 of power converters 21 to 23 into three-phase AC power at the commercial frequency. The three-phase AC power generated by inverters 41 of power converters 21 to 23 is supplied to load 2 through output filter 30 and switches S4 to S6 to keep load 2 operating.

Thus, even when an outage occurs, operation of load 2 is continued as long as battery 3 stores DC power. When supply of AC power from commercial AC power supply 1 is restarted, operation of converters 40 of power converters 21 to 23 is restarted. In each of power converters 21 to 23, converter 40 generates DC power, and the DC power is supplied to battery 3 through bidirectional chopper 24 and switches S7, S8, and also supplied to inverter 41. Thus, the original condition is recovered. The configuration and operation of each of the other uninterruptible power supply devices U2 to UN are identical to those of uninterruptible power supply device U1, and therefore, the description thereof is not repeated.

A description is now given of cross current generated when uninterruptible power supply devices U1 to UN operate in parallel during a normal condition in which commercial AC power supply 1 properly supplies three-phase AC power. As shown in FIGS. 1 to 5, in this uninterruptible power supply system, respective AC input terminals (TIa, TIb, or TIc) of N uninterruptible power supply devices U1 to UN are connected to one another, respective AC output terminals (TOa, TOb, or TOc) thereof are connected to one another, and respective battery terminals (TBP or TBN) thereof are connected to one another.

When respective AC output voltages (VR, VS, or VT) of N uninterruptible power supply devices U1 to UN are completely identical to one another in terms of phase and voltage value, no cross current flows. Actually, however, respective AC output voltages (VR, VS, or VT) of N uninterruptible power supply devices U1 to UN are not identical to one another in terms of phase and voltage value, resulting in cross current flowing through uninterruptible power supply devices U1 to UN.

For example, it is supposed that the phase of PWM signals φ5 to φ8 for transistors Q5 to Q8 of power converter 21 in uninterruptible power supply device U1 is advanced relative to the phase of PWM signals φ5 to φ8 for transistors Q5 to Q8 of power converter 21 in uninterruptible power supply device U2, and the phase of output AC voltage VR of uninterruptible power supply device U1 is advanced relative to the phase of output AC voltage VS of uninterruptible power supply device U2.

In this case, a period is generated in which transistor Q5 of inverter 41 in uninterruptible power supply device U1 is ON and transistors Q7, Q8 of inverter 41 in uninterruptible power supply device U2 are ON.

In this period, in uninterruptible power supply device U2, cross current flows in a path from output terminal TOa to battery terminal TBP through output terminal 21b and transistors Q8, Q7 of power converter 21 and terminal T3, diode D12, and coil 51 of bidirectional chopper 24. The cross current flows from battery terminal TBP of uninterruptible power supply device U2 to battery terminal TBP of uninterruptible power supply device U1. Further, in uninterruptible power supply device U1, the cross current flows in a path from battery terminal TBP to output terminal TOa through coil 51, transistor Q11, and terminal T1 of bidirectional chopper 24 and transistor Q5 of power converter 21.

At this time, if merely transistors Q11, Q14 of bidirectional chopper 24 are alternately caused to be ON for the same time, I1 of bidirectional chopper 24 in uninterruptible power supply device U2 increases to meet I1>I2, and I1 of bidirectional chopper 24 in uninterruptible power supply device U1 decreases to meet I1<I2. When I1≠I2 holds, the inductance of normal mode reactor 50 is decreased. Further, the cross current causes useless power consumption.

In view of this, the present embodiment suppresses the cross current by controlling the ON period of transistors Q11, Q14 of bidirectional chopper 24 so that I1=I2 holds in each uninterruptible power supply devices U1, U2. Specifically, for uninterruptible power supply device U2 in which I1>I2 holds, the ON period of transistor Q11 is shortened to decrease current I1 and the ON period or transistor Q14 is extended to increase current I2, so as to meet I1=I2. For uninterruptible power supply device U1 in which I1<I2 holds, the ON period of transistor Q11 is extended to increase current I1 and the ON period of transistor Q14 is shortened to decrease current I2, so as to meet I1=I2. Control can thus be conducted so as to meet I1=I2 and thereby suppress cross current circulating through uninterruptible power supply devices U1 and U2.

Further, in the above case, a period is also generated in which transistor Q6 of inverter 41 in uninterruptible power supply device U1 is ON and transistors Q7, Q8 of inverter 41 in uninterruptible power supply device U2 is ON.

In this period, in uninterruptible power supply device U1, cross current flows in a path from output terminal TOa to battery terminal TBN through output terminal 21b and transistor Q6 of power converter 21 and terminal T2, transistor Q14, and coil 52 of bidirectional chopper 24. The cross current flows from battery terminal TBN of uninterruptible power supply device U1 to battery terminal TBN uninterruptible power supply device U2. Further, in uninterruptible power supply device U2, the cross current flows in a path from battery terminal TBN to output terminal TOa through coil 52, diode D13, and terminal T3 of bidirectional chopper 24 and transistors Q7, Q8 and output terminal 21b of power converter 21.

At this time, if merely transistors Q11, Q14 of bidirectional chopper 24 are alternately caused to be ON for the same time, I2 of bidirectional chopper 24 in uninterruptible power supply device U1 decreases to meet I1>I2, and I2 of bidirectional chopper 24 in uninterruptible power supply device U2 increases to meet I1<I2. When I1≠I2 holds, the inductance of normal mode reactor 50 is decreased. Further, the cross current causes useless power consumption.

In view of this, the present embodiment suppresses the cross current by controlling the ON period of transistors Q11, Q14 of bidirectional chopper 24 so that I1=I2 holds in each of uninterruptible power supply devices U1, U2. Specifically, for uninterruptible power supply device U1 in which I1>I2 holds, the ON period of transistor Q11 is shortened to decrease current I1 and the ON period or transistor Q14 is extended to increase current I2, so as to meet I1=I2. For uninterruptible power supply device U2 in which I1<I2 holds, the ON period of transistor Q11 is extended to increase current I1 and the ON period of transistor Q14 is shortened to decrease current I2, so as to meet I1=I2. Control can thus be conducted so as to meet I1=I2 and thereby suppress cross current circulating through uninterruptible power supply devices U1, U2.

While the description is given above of cross current flowing through uninterruptible power supply devices U1 and U2, the description is applied as well to cross current circulating through uninterruptible power supply devices U1 to UN.

Figure 6:
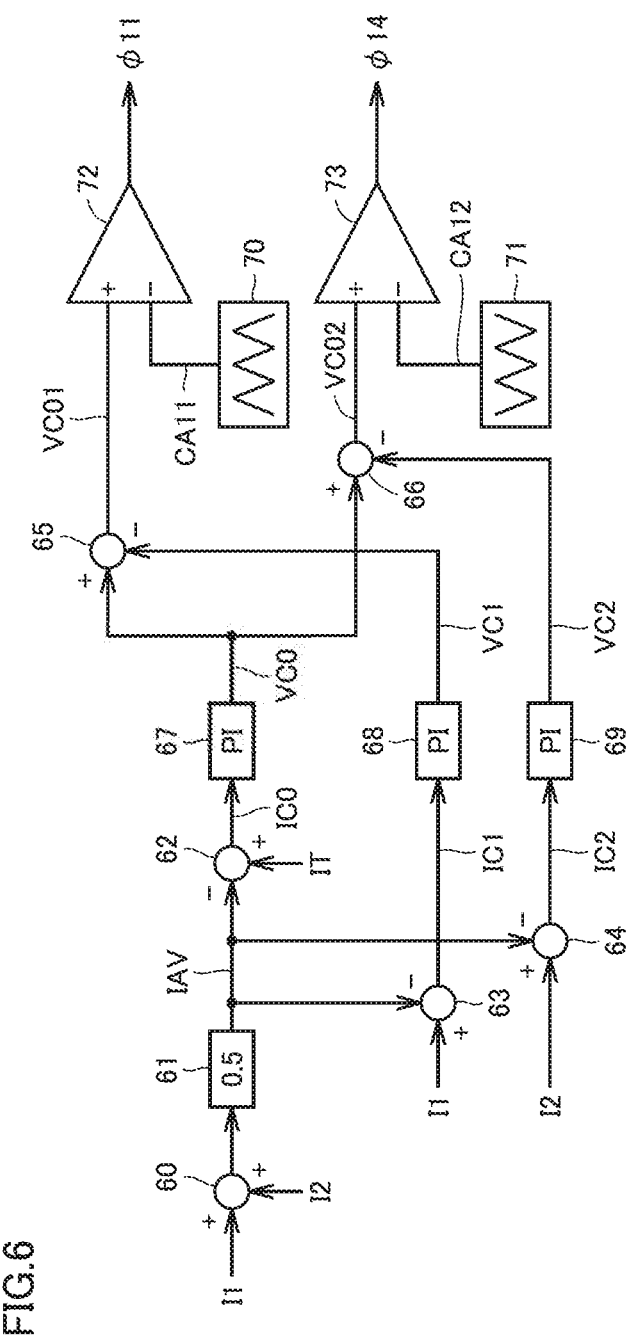
FIG. 6 is a block diagram showing components invoked in charging of a battery that are included in a controller shown in FIG. 5.

In the following, the method for suppressing cross current by controlling the ON period of transistors Q11, Q14 of bidirectional chopper 24 is described in more detail. FIG. 6 is a block diagram showing components involved in charging of battery 3 that are included in controller 53 shown in FIG. 5. In FIG. 6, controller 53 includes an adder 60, a multiplier 61, subtractors 62 to 66, control units (PI) 67 to 69, triangular wave generators 70, 71, and comparators 72, 73.

Adder 60 adds together a detected value of current I1 detected by current detector CD11 and a detected value of current I2 detected by current detector CD12. Multiplier 61 multiplies the sum calculated by adder 60 by 0.5 to determine average value IAV of the detected values of current I1 and current I2. Subtractor 62 subtracts, from target charging current value IT, average value IAV of the detected values of current I1 and current I2 determined by multiplier 61 to determine current command value IC0. Target charging current value IT is generated depending on the difference between target terminal-to-terminal voltage VBT of battery 3 and actual terminal-to-terminal voltage VB of battery 3. Control unit 67 performs PI control (proportional integral control) for example on current command value IC0 to generate voltage command value VC0.

Subtractor 63 subtracts, from the detected value of current I1 detected by current detector CD11, average value IAV of the detected values of current I1 and current I2 determined by multiplier 61 to determine current command value IC1. Control unit 68 performs PI control for example on current command value IC1 to generate voltage command value VC1.

Subtractor 64 subtracts from the detected value of current I2 detected by current detector CD12, average value IAV of the detected values of current I1 and current I2 determined by multiplier 61 to determine current command value IC2.

Control unit 69 performs PI control for example on current command value IC2 to generate voltage command value VC2.

Subtractor 65 subtracts voltage command value VC1 from voltage command value VC0 to generate voltage command value VC01. Subtractor 66 subtracts voltage command value VC2 from voltage command value VC0 to generate voltage command value VC02.

Triangular wave generator 70 generates triangular wave signal CA11 having a sufficiently higher frequency than the commercial frequency. Triangular wave generator 71 generates triangular wave signal CA12 having the same frequency as the frequency of triangular wave signal CA11. The phase shift between triangular wave signals CA11 and CA12 is 180° C.

Comparator 72 compares the level of voltage command value VC01 with the level of triangular wave signal CA11. When VC01>CA11 holds, comparator 72 sets PWM signal φ11 to "H" level. When VC01<CA11 holds, comparator 72 sets PWM signal φ11 to "L" level.

Comparator 73 compares the level or voltage command value VC02 with the level of triangular wave signal CA12. When VC02>CA12 holds, comparator 73 sets PWM signal φ12 to "H" level. When VC02<CA12 holds, comparator 73 sets PWM signal φ12 to "L" level.

Thus, when no cross current flows and I1=I2 holds, I1=I2=IAV, VC1=VC2=0, and VC0=VC01=VC02 hold and the duty ratio of PWM signal φ11 is equal to the duty ratio of PWM signal φ14. In this case, the ON period per cycle of transistor Q11 is equal to the ON period per cycle of transistor Q14.

When cross current flows and I1>I2 holds, I1>IAV>I2, VC1>VC2 and VC01<VC02 hold and the duty ratio of PWM signal φ11 is smaller than the duty ratio of PWM signal φ14. Then, transistors Q11, Q14 are controlled so that the ON period per cycle of transistor Q11 is shorter than the ON period per cycle of transistor Q14 to decrease I1 and increase I2, and thereby suppress the cross current.

When cross current flows and I1<I2 holds, I2>IAV>I1, VC2>VC1, and VC02<VC01 hold and the duty ratio of PWM signal φ11 is larger than the duty ratio of PWM signal φ14. Then, transistors Q11, Q14 are controlled so that the ON period per cycle of transistor Q11 is longer than the ON period per cycle of transistor Q14 to increase I1 and decrease I2 and thereby suppress the cross current.

Such a controller 53 is placed in each of uninterruptible power supply devices U1 to UN. Therefore, in this uninterruptible power supply system, cross current flowing through uninterruptible power supply devices U1 to UN is suppressed.

Figure 7:
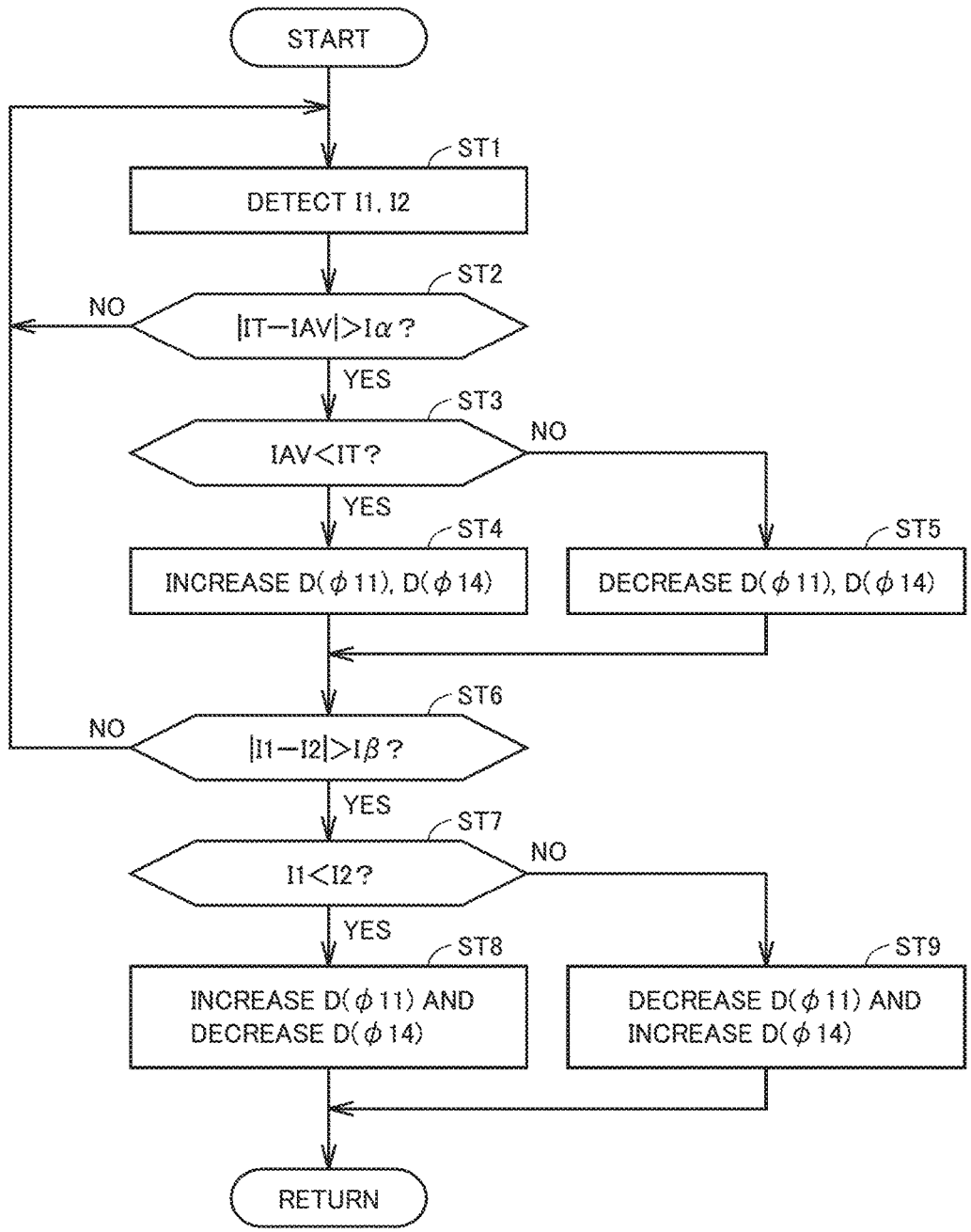
FIG. 7 is a flowchart showing an operation of the controller in a charging mode shown in FIGS. 5 and 6.

FIG. 7 is a flowchart showing an operation of controller 53 shown in FIGS. 5 and 6 in a charging mode. In FIG. 7, controller 53 uses current detectors CD11, CD12 to detect current I1 and current I2 in step ST1. In step ST2, controller 53 determines whether or not the absolute value |IT−IAV| of the difference between target charging current value IT and average value IAV=0.5×(I1+I2) is larger than threshold value Iα. When |IT−IAV|>Iα does not hold (i.e., IT≈IAV), controller 53 returns to step ST1. When |IT−IAV|>Iα holds (i.e., IT≠IAV), controller 53 proceeds to step S13. Iα is set to a value that is sufficiently smaller than IT and IAV. Target charging current value IT is generated depending on the difference between target terminal-to-terminal voltage VBT of battery 3 and actual terminal-to-terminal voltage VB of battery 3 as described above.

In step ST3, controller 53 determines whether or not IAV<IT holds. When IAV<IT holds, controller 53 proceeds to step ST4. When IAV<IT does not hold, controller 53 proceeds to step ST5. In step ST4, controller 53 increases duty ratio D(φ11) and, duty ratio D(φ14) of PWM signals φ11 and φ14. Accordingly, the ON period per cycle of each of transistors Q11 and Q14 is increased and average value IAV is increased to approach target value IT. In step ST5, controller 53 decreases duty ratio D(φ11) and duty ratio D( 14) of PWM signals φ11 and φ14. Accordingly, the ON period per cycle of each of transistors Q11 and Q14 is decreased and average value IAV is decreased to approach target value IT.

Subsequently, in step ST6, controller 53 determines whether or not the absolute value |I1−I2| of the difference between the detected values of current I1 and current I2 is larger than threshold value Iβ. When |I1−I2|>Iβ does not hold (i.e., I1≈I2), controller 53 returns to step ST1. When |I1−I2|>Iβ holds (i.e., I1≠I2), controller 53 proceeds to step ST7. Iβ is set to a value sufficiently smaller than I1 and I2.

In step ST7, controller 53 determines whether or not I1<I2 holds. When I1<I2 holds, controller 53 increases duty ratio D(φ11) of PWM signal φ11 and decreases duty ratio D(φ14) of PWM signal φ14 in step ST8, and returns to step ST1. Accordingly, the ON period per cycle of transistor Q11 is increased and the ON period per cycle of transistor Q14 is decreased to increase current I1 and decrease current I2 and thereby suppress cross current.

When controller 53 determines that I1<I2 does not hold in step ST7, controller 53 decreases duty ratio D(φ11) of PWM φ11 and increases the duty ratio D(φ14) of PWM signal φ14 in step ST9, and returns to step ST1. Accordingly, the ON period per cycle of transistor Q11 is decreased and the ON period per cycle of transistor Q14 is increased to decrease current I1 and increase current I2 and thereby suppress cross current. Steps ST1 to ST9 can be repeated to cause IAV≈IT and I1≈I2 to hold, charge battery 3 to target voltage VBT and suppress cross current.

In steps ST4, ST5, duty ratios D(φ11), D(φ14) of PWM signals φ11, φ14 may be increased or decreased by a certain value, or the value by which duty ratios D(φ11), D(φ14) of PWM signals φ11, φ14 is increased or decreased may be changed depending on the difference between IAVT and IAV.

Likewise, in steps ST8, ST9, duty ratios D(φ11), D(φ14) of PWM signals φ11, φ14 may be increased or decreased by a certain value, or the value by which duty ratios D(φ11), D(φ14) of PWM signals φ11, φ14 is increased or decreased may be changed depending on the difference between I1 and I2.

In the present embodiment, current I1 and current I2 flowing through coils 51 and 52 of bidirectional chopper 24 are detected, and the ON period of each of transistors Q11 and Q14 is increased or decreased so as to cause the detected value of current I1 to be equal to the detected value of current I2, and thereby suppress cross current. Therefore, as compared with the case where a saturable reactor is provided for each of uninterruptible power supply devices, the size and the cost of the device can be reduced.

If large cross current flows, useless power consumption is increased and the power efficiency of the uninterruptible power supply system is reduced. In contrast, the present embodiment can reduce cross current and therefore increase the power efficiency of the uninterruptible power supply system.

Further, when cross current flows to cause I1≠I2 to hold, the inductance of normal mode reactor 50 of bidirectional chopper 24 is decreased. In this case, it is necessary to provide a large-sized and expensive normal mode reactor 50 having a large inductance. The present embodiment, however, can reduce cross current and therefore prevent the decrease of the inductance of normal mode reactor 50 of bidirectional chopper 24 due to cross current. Accordingly, a small-sized and inexpensive normal mode reactor 50 can be used.

In the present embodiment, when I1≠I2 holds, the ON period of one of transistors Q11 and Q14 of bidirectional chopper 24 is increased and the ON period of the other transistor is decreased so as to cause I1=I2 to hold. This is not a limitation. Specifically, the ON period of one of transistors Q11 and Q14 may be increased or decreased and the ON period of the other transistor may be kept as it is so as to cause I1=I2 to hold.

It should be construed that the embodiments disclosed herein are given by way of illustration in all respects, not by was of limitation. It is intended that the scope of the present invention is defined by claims, not by the description above, and encompasses all modifications and variations equivalent in meaning and scope to the claims.

REFERENCE SIGNS LIST 1 commercial AC power supply; 2 load; 3 battery; U1-UN uninterruptible power supply device; T1a-T1c AC input terminal; T0a-T0c AC output terminal; TBP, TBN battery terminal; S1-S8 switch; 10 input filter; 11-13, 31-33 reactor; 14-15, 34-36, C1, C2, C11, C12 capacitor; CD1-CD6, CD11, CD12 current detector; 21-23 power converter; 24 bidirectional chopper; 30 output filter, 40 converter; 41 inverter, 42, 53 controller; Q1-Q8, Q11-Q14 transistor; D1-D8, D11-D14 diode; L1 DC positive bus; L2 DC negative bus; L3 DC neutral point bus; F1-F3, F11, F12 fuse; 50 normal mode reactor; 51, 52 coil; T1-T5 terminal; 60 adder; 61 multiplier; 62-66 subtractor; 67-69 control unit: 70, 71 triangular wave generator; 72, 73 comparator

The invention claimed is:

1. An uninterruptible power supply device comprising:
a converter configured to convert an AC voltage supplied from an AC power supply into a first DC voltage, a second DC voltage, and a third DC voltage and output the first, second, and third DC voltages to a first DC bus, a second DC bus, and a third DC bas, respectively;
an inverter configured to convert the first, second, and third DC voltages supplied through the first, second, and third DC buses into an AC voltage and supply the AC voltage to a load;
a bidirectional chopper connected between the first, second, and third DC buses and a power storage device, the first DC voltage being higher than the second DC voltage, and the third DC voltage being an intermediate voltage between the first DC voltage and the second DC voltage,
the bidirectional chopper including
a first transistor and a second transistor connected in series between the first DC bus and the third DC bus,
a third transistor and a fourth transistor connected in series between the third DC bus and the second DC bus,
a first diode, a second diode, a third diode, and a fourth diode connected in anti-parallel with the first transistor, the second transistor, the third transistor, and the fourth transistor, respectively, and
a normal mode reactor including a first coil connected between a first node and a positive electrode of the power storage device, and a second coil connected between a negative electrode of the power storage device and a second node, the first node being located between the first transistor and the second transistor, the second node being located between the third transistor and the fourth transistor; and a controller configured to perform
- a charging mode during a normal condition in which the AC power supply supplies an AC voltage, the controller in the charging mode causing the first transistor and the fourth transistor to be complementarily turned on to charge the power storage device, and
- a discharging node during an outage in which the AC power supply stops supply of AC power, the controller in the discharging mode causing the second transistor and the third transistor to be complementarily turned on to discharge the power storage device,
- the controller in the charging mode controlling an ON period of at least one of the first transistor and the fourth transistor to cause a value of current flowing through the first coil to be equal to a value of current flowing through the second coil.

2. The uninterruptible power supply device according to claim 1, further comprising:
- a first current detector configured to detect current flowing from the first node to the positive electrode of the power storage device through the first coil; and
- a second current detector configured to detect current flowing from the negative electrode of the power storage device to the second node through the second coil, wherein
- the controller in the charging mode controls the ON period of at least one of the first transistor and the fourth transistor to cause a value detected by the first current detector to be equal to a value detected by the second current detector.

3. The uninterruptible power supply device according to claim 2, wherein
the controller is configured to:
- calculate an average value of the value detected by the first current detector and the value detected by the second current detector;
- control the ON period of the first transistor to cause the average value to be equal to the value detected by the first current detector; and
- control the ON period of the fourth transistor to cause the average value to be equal to the value detected by the second current detector.

4. The uninterruptible power supply device according to claim 2, wherein
- the controller is configured to compare the value detected by the first current detector with the value detected by the second current detector,
- when the value detected by the first current detector is smaller than the value detected by the second current detector, the controller is configured to increase the ON period of the first transistor and decrease the ON period of the fourth transistor, and
- when the value detected by the first current detector is larger than the value detected by the second current detector, the controller is configured to decrease the ON period of the first transistor and increase the ON period of the fourth transistor.

5. An uninterruptible power supply system comprising a plurality of uninterruptible power supply devices each as recited in claim 1,
- the plurality of uninterruptible power supply devices being connected in parallel with one another to a load and sharing the power storage device.

6. The uninterruptible power supply system according to claim 5, wherein
- the controller controls the ON period of at least one of the first transistor and the fourth transistor to cause the value of current flowing through the first coil to be equal to the value of current flowing through the second coil and suppress cross current flowing through the plurality of uninterruptible power supply devices.

* * * * *